United States Patent [19]

Gillis

[11] Patent Number: 5,079,271
[45] Date of Patent: Jan. 7, 1992

[54] METHOD FOR THE PREPARATION OF POLYMERIC FOAMS

[75] Inventor: Herbert R. Gillis, Sterling Heights, Mich.

[73] Assignee: Imperial Chemical Industries PLC, London, England

[21] Appl. No.: 380,338

[22] Filed: Jul. 17, 1989

[30] Foreign Application Priority Data

Jul. 15, 1988 [GB] United Kingdom ............... 8816945

[51] Int. Cl.$^5$ ............................................. C08G 18/14
[52] U.S. Cl. .................................. 521/125; 521/157; 521/158
[58] Field of Search ...................... 521/125, 157, 158

[56] References Cited

U.S. PATENT DOCUMENTS 4,417,002 11/1983 Liessem ........................... 521/128

*Primary Examiner*—Maurice J. Welsh
*Assistant Examiner*—Rachel Johnson
*Attorney, Agent, or Firm*—Cushman, Darby & Cushman

[57] ABSTRACT

A method for the preparation of polymeric foams which comprises reacting under $CO_2$ liberating conditions an organic polyisocyanate with an aldehyde or ketone having a nucleophilic or isocyanate-reactive center within 6 atoms of the carbon atom of the carbonyl group. The method is useful for making foams with reduced amounts of CFC-blowing agents or even in the absence of CFC-blowing agents.

10 Claims, No Drawings

METHOD FOR THE PREPARATION OF POLYMERIC FOAMS

This invention relates to polymeric foams and more especially to polymeric foams derived from organic polyisocyanates and to a method for their preparation.

The production of foamed material based on polyurethane and other polymer systems derived from organic polyisocyanates is well established. Depending upon the formulations used in their manufacture, the products can vary in texture from the soft flexible foams used as cushioning materials to the rigid foams used as insulating or structural materials. Similarly, depending upon the amount of blowing agent used, products having densities varying between about 10 and about 1100 kg/m$^3$ can be made.

Several reactive or volatile compounds have been proposed as blowing agents for use in the production of isocyanate based foams but, in practice, the bulk of such foams are made using either water, which reacts with the polyisocyanate to form carbon dioxide, or trichlorofluoromethane, which vaporises under the influence of the exothermic reaction, or mixtures of the two. Water is the principal blowing agent used in the production of flexible polyurethane foams whilst trichlorofluoromethane is the principal agent used in making rigid polyurethane and polyisocyanurate foams.

In recent years it has been suggested that chlorofluoromethanes such as trichlorofluoromethane could be responsible for depletion of the earth's ozone layer and it has been decided that the amount used as an aerosol propellant and as blowing agent should be reduced. Accordingly, it will be necessary in many isocyanate based foam formulations to replace trichlorofluoromethane, at least in part, by other blowing agents. It is not always possible to use water as a replacement, its use in polyisocyanurate formulations, for example, being undesirable because of interference with the isocyanate trimerisation reaction, a problem which becomes more severe as the level of water in the formulation increases. Alternative blowing agents are therefore required.

It has now been found that appropriately substituted aldehydes and ketones are effective blowing agents for use in the production of isocyanate based foams, in the presence of metal carboxylate catalysts.

Thus, according to the invention, there is provided a method for the preparation of polymeric foams which comprises reacting an organic polyisocyanate with an aldehyde or ketone having a nucleophilic or isocyanate-reactive centre within 6 atoms of the carbon atom of the carbonyl group under conditions which provide for the liberation of $CO_2$ from the reaction of said polyisocyanate with said aldehyde or ketone compound. Conditions which provide for $CO_2$ liberation include the use of metal carboxylate catalysts, such as potassium 2-ethylhexanoate.

With "centre within 6 atoms of the carbon atom of the carbonyl group" is meant that there are not more than 6 atoms between the centre and the carbon atom of the carbonyl group determined in the structural formula via the shortest route.

Suitable aldehydes and ketones include those having at least one carbonyl group directly attached to an aliphatic, cycloaliphatic, aromatic or heterocyclic residue. Nucleophilic or isocyanate-reactive centres which may be present in the aldehyde or ketone molecule particularly include groups of the formula $-OR^1$, $-NR^2R^3$ and $=N-R^1$ wherein each of $R^1$, $R^2$ and $R^3$, independently, represents hydrogen or an optionally substituted hydrocarbon radical. Thus, suitable compounds include hydroxy substituted aldehydes and ketones and the ethers thereof and amino substituted aldehydes and ketones wherein the amino groups may be primary, secondary or tertiary.

Further examples of isocyanate-reactive or nucleophilic centres which may be present in the aldehyde or ketone compounds include amide, imide, ester, urethane, allophanate, acylurethane, acylamide, imine, amidine, guanidine, imidine, isourea, isoamide, oxazoline, carbonate, imino-carbonate, imino-ester, imidazoline, enamine, ketene-aminal, ketone, aldehyde, acid anhydride, thioether, acetal, thioacetal, ketal, thioketal, ortoester, thio-orthoester, orthocarbonate, thio-orthocarbonate, carboxylic acid, sulphonic acid and phosphonic acid groups as well as the esters, metal salts, ammonium salts, phosphonium salts and sulphonium salts of the aforesaid acids. Still further examples of isocyanate-reactive or nucleophilic centres include sulphate esters, phosphate esters, alkoxide salts, mercaptide salts, phenoxide salts and the like.

It is preferred that the isocyanate-reactive or nucleophilic centres contain one or more active hydrogen atoms. Hydroxyl groups are preferred.

Preferably, the nucleophilic or isocyanate-reactive centre is within 4 atoms of, and more preferably 1 or 2 atoms from, the carbonyl carbon atom. Preferably the nucleophilic or isocyanate-reactive centre is an hydroxy or amino group and most preferably an hydroxy group.

Specific examples of suitable aldehydes and ketones include hydroxyacetone, dihydroxyacetone, o-hydroxybenzaldehyde, 4-hydroxy-2-butanone and 3-hydroxy-2,2-dimethylpropionaldehyde.

Organic polyisocyanates which may be used in the process of the invention include aliphatic, cycloaliphatic and araliphatic polyisocyanates, for example 1,6-hexamethylene diisocyanate, isophorone diisocyanate, cyclohexane-1,4-diisocyanate, 4,4-dicyclohexylmethane diisocyanate and p-xylylene diisocyanate, but especially those aromatic polyisocyanates conventionally used in the manufacture of polyurethane and polyisocyanurate foams. Of particular importance are the tolylene diisocyanates (TDI) and diphenylmethane diisocyanates (MDI) in their various pure, modified and crude forms. Special mention may be made of the so-called MDI variants (diphenylmethane diisocyanates modified by the introduction of urethane, allophanate, urea, biuret, carbodiimide, uretonimine or isocyanurate residues) and crude MDI (polymethylene polyphenylene polyisocyanate mixtures).

The ratio of NCO groups : NCO-reactive groups in the reaction system is 0.70 –25 and preferably 0.90 –18.

The rate of reaction between organic polyisocyanates and the substituted aldehydes or ketones can vary over a wide range depending upon the specific polyisocyanate and aldehyde or ketone used. In most cases, it will be necessary to employ a catalyst in order to achieve foam formation. Suitable catalysts include those already known for the reactions of organic polyisocyanates, that is to say catalysts for the polymerisation, for example trimerisation, of polyisocyanates and active hydrogen compounds. Both types of catalysts have been fully described in the prior art although many catalysts are effective for more than one type of reaction, for example both trimerisation and reaction with a hydroxy compound, so that clear distinction between catalysts on the basis of their function is not always possible.

Metal salts of carboxylic acids, such as potassium 2-ethylhexanoate and the like, are highly preferred catalysts because these catalysts promote the desired liberation of $CO_2$ to produce foam.

The reactions of certain of the substituted aldehydes or ketones is extremely catalyst dependent. For example, o-hydroxybenzaldehyde is stable when mixed with aromatic polyisocyanates such as crude MDI but a vigorous foaming reaction takes place if potassium 2-ethylhexanoate is present.

Typical catalysts used in the preparation of urethane foams include members of the following classes:

1) Tertiary amines, for example trialkylamines such as triethylamine, dialkylcycloalkylamines such as N,N-dimethyl-cyclohexylamine, dialkylaralkylamines such as N,N-dimethyl-benzylamine, N-alkyl-morpholines, piperidines and pyrrolidines, N,N-dialkylpiperazines, bis(dimethylamino-ethyl)ether, 1,4-dialkylpiperazines, bis(dimethylamino-ethyl)ether, 1,4-diazabicyclo[2.2.2]octane, N,N',N"-tris-(dialkylaminoalkyl) hexahydrotriazines such as N,N',N"-tris-(dimethylaminopropyl) hexadrotriazine, tris(dialkylamino-alkyl)phenols such as 2,4,6-tris(dimethylaminomethyl)phenol, tetra-alkyl-guanidines such as N,N',N",N40 -tetramethylguanidine and alkanolamines which may function both as catalysts and isocyanate-reactive compounds such as N-methyldiethanol-amine, triethanolamine and N,N',N",N"-tetrakis (2-hydroxypropyl)ethylene diamine, 2) Combinations of tertiary amines with monomeric epoxy compounds such as propylene oxide or phenyl glycidyl ether, 3) Alkali metal salts of lower alkanoic acids, for example the sodium, potassium and lithium salts of acetic, butyric and 2-ethylhexoic acids, 4) Non-basic metal salts of lower alkanoic acids, for example lead octoate and stannous octoate, 5) Dialkyltin salts, for example dibutyltin dilaurate and dibutyltin diacetate.

Combinations of catalysts from the same or different classes may be used and this may often be advantageous.

A particularly preferred class of catalysts comprises the alkali metal salts of carboxylic acids, in particular potassium 2-ethylhexanoate.

Suitable concentrations of catalyst providing acceptable rates of foam formation and cure can readily be determined by a person skilled in the art. In general the amount of catalyst will be 0.001 -10 % w of the total reaction system and preferably 0.01 -5 % w and more preferably 0.05 -3 % w.

The method of the invention may be performed by bringing together one or more polyisocyanates, one or more appropriately substituted aldehydes and/or ketones and any necessary catalysts in any manner which will provide efficient mixing of the ingredients. In those cases where the carbonyl compound reacts with the polyisocyanate even in the absence of a catalyst, a first stream containing the polyisocyanate may be combined in a mixing chamber with a second stream containing the carbonyl compound and catalyst. Where there is negligible reaction between the carbonyl compound and polyisocyanate in the absence of catalyst, the same mixing procedure can be used or, alternatively, a first stream containing the polyisocyanate and the carbonyl compound may be combined with a second stream containing the catalyst.

In addition to the ingredients already mentioned, the foam forming reaction mixture may contain one or more other conventional ingredients of such reaction mixtures. As examples of other such optional ingredients, there may be mentioned other isocyanate reactive materials, fire retardants, fillers, dyes, pigments and internal mould release agents.

As examples of other isocyanate reactive materials which may be included in the foam forming reaction mixture, there may be mentioned low molecular weight or polymeric polyols, for example the polyether polyols already used or proposed to be used in the manufacture of flexible or rigid polyurethane foams. Such other isocyanate reactive materials, on the other hand, are not essential (see the examples).

As examples of other blowing agents, there may be mentioned water and inert volatile liquids such as hydrocarbons and halogenated hydrocarbons, like chlorofluorocarbons for example trichlorofluoromethane. Such other blowing agents, on the other hand, are not essential (see the examples).

Surfactants and foam stabilisers which may be used include siloxane-oxyalkylene copolymers.

By suitable choice of reactive ingredients and concentration of blowing agents, the foams made by the method of the invention may be flexible or rigid, high density (for example greater than about 60 kg/m$^3$) or low density (for example between about 20 and about 60 kg/m$^3$). Furthermore, the foams may be provided with fillers, reinforcements or facings of the types known in the art. By suitable choice of surfactant, density and processing conditions, the foams may be prepared so as to have open or closed cells or they may be plastic or elastomeric mouldings having integral skins. Conventional techniques for controlling open cell content, cell size and skin (surface) quality may be used.

The invention is illustrated but not limited by the following Examples in which all parts and percentages are by weight.

EXAMPLE 1

A mixture of o-hydroxybenzaldehyde (11.13 parts), potassium 1-ethylhexanoate (0.5 part) and SR242 (a silicone surfactant ex BP Chemical) (0.5 part) was rapidly blended with crude MDI containing approximately 50% of diphenylmethane diisocyanates and 50 % of polyphenylmethylene polyisocyanates (crude MDI is available from ICI Polyurethanes as Suprasec DNR) (87.87 parts). After a cream time of 8 secs, foaming occurred to give a rigid foam having a density of 60 kg/m$^3$.

EXAMPLE 2

A mixture of o-hydroxybenzaldehyde (11.13 parts) and crude MDI (87.87 parts) was rapidly blended with a mixture of potassium 2-ethylhexanoate (1.0 part) and SR242 (0.5 part). After a cream time of 5 secs, foaming occurred to give a rigid foam having a density of 60 kg/m$^3$.

EXAMPLE 3

A "prepolymer" was prepared by heating o-hydroxybenzaldehyde (25 parts) with crude MDI (75 parts) at 80° C. After cooling to room temperature, the prepolymer (50.94 parts) was blended with crude MDI (46.06 parts). This blend (59 parts) was then mixed with potassium 2-ethylhexanoate (0.5 part) and SR242 (0.5 part). Foaming occurred after a cream time of 3 secs.

EXAMPLE 4

A rigid foam having a density of 25.6 kg/m$^3$ was obtained by mixing a blend of hydroxyacetone (10.97 parts), potassium 2-ethylhexanoate (2.0 parts) and SR242 (0.5 part) with crude MDI (86.57 parts). A cream time of 1.5 minutes and an end of rise of 2.5 minutes were observed.

EXAMPLE 5

A rigid foam having a density of 22.5 kg/m$^3$ was obtained by mixing a blend of 4-hydroxy-2-butanone (12.51 parts), potassium 2-ethylhexanoate (4.0 parts) and SR242 (0.5 part) with crude MDI (82.99 parts). A cream time of 6 secs and an end of rise time of 8 secs were observed.

I claim:

1. A method for the preparation of polymeric foams which comprises reacting an organic polyisocyanate with an aldehyde or ketone compound containing, within 6 atoms of the carbon atom of the carbonyl group, a nucleophilic group of atoms or an isocyanate-reactive group of atoms, under conditions which provide for the liberation of $CO_2$ from the reaction of said polyisocyanate with said aldehyde or ketone compound.

2. A method according to claim 1 wherein the nucleophilic group of atoms or the isocyanate-reactive group of atoms present in the aldehyde or ketone is a group of the formula -OR$^1$, -NR$^2$R$^3$ or =N-R$^1$ wherein each of R$^1$, R$^2$ and R$^3$, independently, represents hydrogen or an optionally substituted hydrocarbon radical.

3. A method according to claim 1 wherein the nucleophilic group of atoms or the isocyanante-reactive group of atoms present in the aldehyde or ketone contains one or more active hydrogen atoms.

4. A method according to any preceding claim wherein the nucleophilic group of atoms or the isocyanate-reactive group of atoms is within 4 atoms of the carbonyl carbon atom.

5. A method according to claim 4 wherein the nucleophilic group of atoms or the isocyanate-reactive group of atoms is within 1 or 2 atoms from the carbonyl carbon atom.

6. A method according to any preceding claim wherein a catalyst is used comprising an alkali metal salt of a carboxylic acid.

7. A method according to claim 6 wherein the catalyst is potassium 2- ethylhexanoate.

8. A method according to any preceding claim wherein no inert volatile liquid is used.

9. A method according to any preceding claim wherein no water is used.

10. Polymeric foams made according to claim 1.

* * * * *